Oct. 3, 1950
T. E. GRAVES
2,524,438
THERMOSTATIC SWITCH FOR CLOTHES DRIERS
Filed Feb. 5, 1949
2 Sheets-Sheet 1
FIG. 1
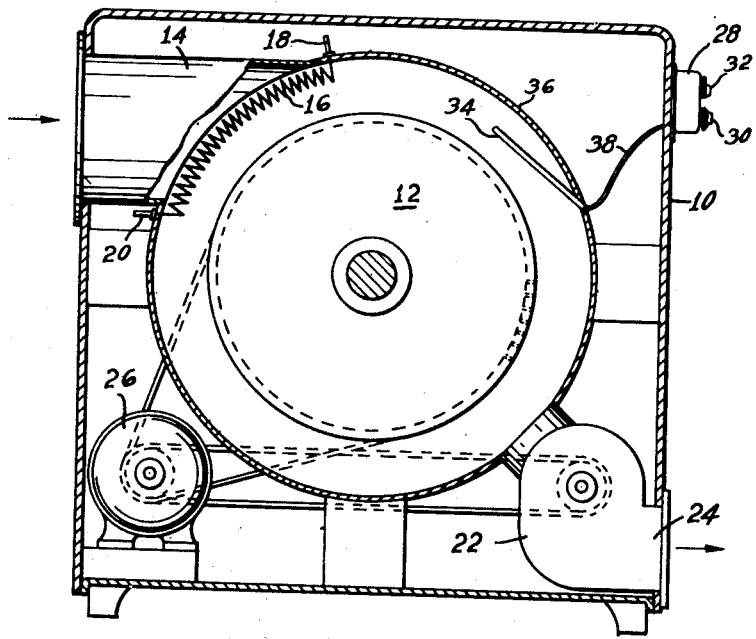
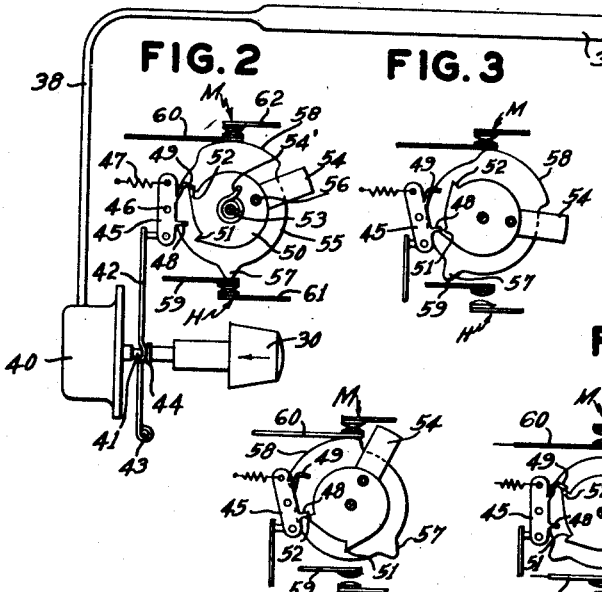
FIG. 2  FIG. 3  FIG. 4
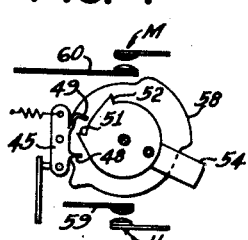
FIG. 6
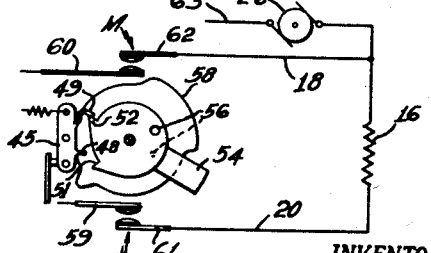
FIG. 5
INVENTOR.
Theodore E. Graves
BY
ATTORNEYS Oct. 3, 1950 T. E. GRAVES 2,524,438
THERMOSTATIC SWITCH FOR CLOTHES DRIERS
Filed Feb. 5, 1949 2 Sheets-Sheet 2
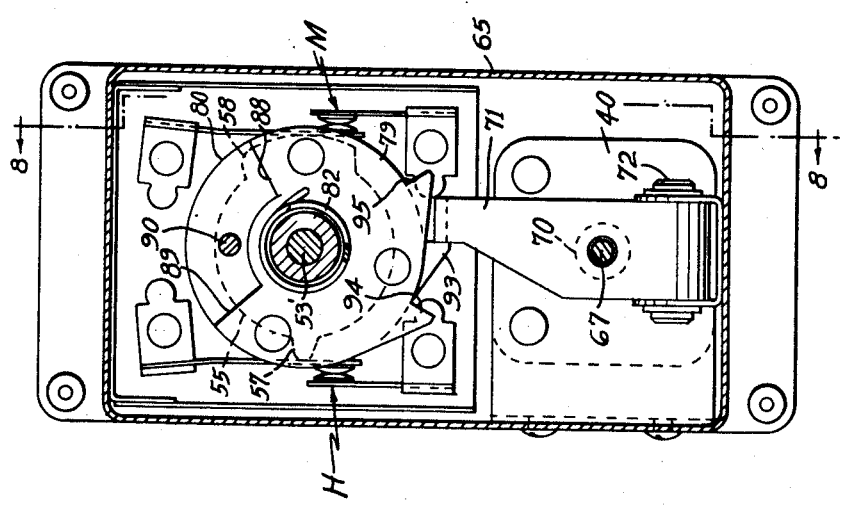
INVENTOR.
Theodore E. Graves
BY
ATTORNEYS Patented Oct. 3, 1950

2,524,438

UNITED STATES PATENT OFFICE 2,524,438

THERMOSTATIC SWITCH FOR CLOTHES DRIERS

Theodore E. Graves, West Orange, N. J., assignor to The Wilcolator Company, Elizabeth, N. J., a corporation of Delaware Application February 5, 1949, Serial No. 74,832

20 Claims. (Cl. 200—140)

My invention relates to improvements in thermostatic mechanism for controlling operating cycles such as those involved in the drying of clothes and other articles.

The present application covers an improvement upon the thermostatic mechanism disclosed in my abandoned application Serial No. 785,921, filed November 14, 1947, for "Clothes Drier Control Mechanism."

A number of patents have been granted on so-called automatic clothes drying machines and automatic control mechanisms therefor, and various types of driers have been made and sold, most of which include a thermostat for limiting the temperature, and some of which include timing mechanism for controlling the length of time a batch of clothes is subjected to heating and drying.

The thermostatic mechanism of the present invention is particularly adapted for controlling the cyclic operations of the clothes drier of the type including a rotating drum for the clothes or other articles to be dried, a heater, a fan for circulating air, heated by the heater, through the drum, and a motor for rotating the drum and operating the fan. Known types of thermostatic control mechanism for driers of this type are relatively complicated and in some cases include two thermostats for effecting the control.

As distinguished from known control devices, I have invented a comparatively simple thermostatic mechanism for controlling the operating cycles of driers of the type referred to, such mechanism including only a single thermostat, but being arranged so that two or more electric switches included in the mechanism are operated in sequence in response to the heating and cooling of the thermal element of the thermostat.

The improved thermostatic mechanism according to my invention comprises a thermostat responsive to temperature changes in the device to be controlled, such as a drier, a handle for setting the temperature or temperatures at which the thermostat changes the operation, an escapement mechanism operated by the thermostat, such mechanism being movable manually to a selected position and being biased for movement in the opposite direction from such position, a plurality of switches adapted to be actuated by the escapement mechanism, and means actuated by the thermostat for releasing the escapement mechanism for actuation according to its bias.

According to a preferred form of the invention, the escapement mechanism includes a toothed wheel member biased for rotation in one direction and provided with means for moving it manually in the opposite direction, and detent means associated with the escapement wheel and actuated by the thermostat for holding and releasing the escapement wheel. In a preferred construction, the manually operable means is fixed with respect to the switch actuating means of the escapement mechanism and freely movable in either direction so that the switches normally controlled automatically may be controlled manually in cases of emergency. Such manually operable means is connected with the escapement wheel member by a ratchet means, so that the escapement wheel may be moved by the manual means in a direction opposite to its bias, but is not movable against the retaining action of the detent means.

One of the problems particularly involved in drying operations, and not taken into account in known types of control instruments, is the problem of operating a drier for the drying of successive batches of clothes, one immediately after the other. Some driers have a well-insulated casing surrounding the drying drum which retains a considerable amount of heat, so that when one batch of clothes is dried and the heater and air circulating motor are cut off automatically, and another batch of clothes inserted, it is impossible to restart the apparatus without considerable delay because the temperature of the casing where the bulb of the thermostat is located is so high, and may actually increase after the drier shuts off. When this condition arises and an attempt is made to start the apparatus, the heater will not come on. This situation creates an unnecessary delay in drying successive batches of clothes and may lead a person not acquainted with the characteristics of the drier to the conclusion that the heater is on when the starting lever or knob is operated.

In my improved apparatus, I provide a mechanism adapted to solve this problem and to avoid the difficulties and delays inherent therein. When the thermostatic control mechanism of my invention is used for controlling successive drying operations, the operator may start a succeeding batch immediately, by operating the manual setting means in about the same manner as in starting any batch, and the mechanism is arranged so that the heater will be energized regardless of the fact that the temperature of the drier casing may be so high that the heater would not otherwise come on with the thermostat set at the desired drying temperature.

My invention includes other features and advantages which are described in detail hereinafter in connection with certain illustrative embodiments shown in the accompanying drawings forming a part of this application.

In the drawings:

Fig. 1 is a vertical view partly in section, diagrammatically illustrating one form of clothes drier in which my improved thermostatic control mechanism is used for operating the drier.

Figs. 2 to 6, inclusive, are broken diagrammatic views illustrating one form of my improved thermostatic mechanism including a pair of switches, the successive figures showing different positions of the switch-operating mechanism, in accordance with different operations carried out in connection with the drying of a batch of clothes. Fig. 6 includes a diagrammatic showing of the wiring arrangement for the drier illustrated in Fig. 1.

Fig. 7 is a front vertical sectional view of a modified form of thermostatic control mechanism constructed in accordance with the features of my invention, with certain parts removed, taken on the line 7—7 of Fig. 8.

Fig. 8 is a vertical sectional view of the device shown in Fig. 7 taken approximately on the line 8—8 of Fig. 7 with certain parts broken away.

Fig. 9 is a broken detailed view taken on the line 9—9 of Fig. 8, showing the relationship of the escapement wheel member and the detent associated therewith.

The general arrangement of the apparatus and elements thereof are shown in Fig. 1 of the drawings in which the drier includes a casing 10 having mounted centrally therein a revolving perforated drum 12 for receiving the clothes or other articles to be dried, which are placed in the drum through a side door in the casing, not shown. Air is admitted to the drier casing through an air inlet tube 14 which delivers the air over an electric resistance heating unit 16, connected by lead wires 18 and 20 to the thermostatic control apparatus and current source in the manner shown in Fig. 6 of the drawings. The moist air is discharged from the casing 36 by a blower 22 associated with an air outlet duct 24. The revolving drum 12 and blower 22 are driven by belts, as shown, connected to an electric motor 26.

The drier as shown in Fig. 1 includes in a diagrammatic way my improved thermostatic control mechanism indicated at 28 and provided with a dial 30 for setting the drying temperature, a manual setting or starting means 32, and a bulb 34 mounted inside a casing 36 which surrounds and encloses heater 16 and the rotating drum 12, the bulb 34 being connected by a capillary tube 38 to the temperature control part of the thermostat 28. The duct 14 and the duct leading to the blower 22 open into the casing 36.

The thermostatic device shown diagrammatically in Fig. 1 may include the structure shown in Figs. 2 to 6, or that shown in Figs. 7 to 9. The thermostatic mechanism shown diagrammatically in Figs. 2 to 6 includes the basic operating elements including a chamber 40, connected to the capillary tube 38 and housing an expansible bellows and spring arrangement, of the type illustrated in Fig. 8, which actuates a biased shaft 41 extending through a lever 42 mounted on a pivot 43. The lever 42 bears against a ring 44 on the shaft 41. When the dial 30 is rotated, it in turn rotates the shaft 41, so as to screw it into or out of a threaded sleeve to set the temperature as in conventionally known structures.

The upper end of the lever 42 is connected to the lower end of a lever 45 mounted on a fixed pivot 46, the lever 45 being biased for rotation about this pivot by a tension spring 47 connected to its upper end. The pivoted lever 45 carries a pair of spaced detents 48 and 49 which face toward an escapement wheel 50 having teeth 51 and 52. The escapement wheel 50 is in the same plane as the detents 48 and 49.

The escapement wheel 50 is mounted on a shaft 53, and biased by a spring 54' for clockwise rotation. The shaft also carries in succession a manual control lever 54 and a cam wheel 55 which are fixed to rotate together, but which may be rotated manually in a clockwise direction with respect to the escapement wheel 50. However, the lever 54 is connected to the escapement wheel 50 by a ratchet means 56 which may comprise a spring biased ball carried in the lever 54 and engaging in a hole in the ratchet wheel 50, such as that illustrated in Fig. 8 of the drawings.

The cam wheel 55 includes a narrow angle cam 57 and a wide angle cam 58 mounted opposite each other for actuating movable switch members 59 and 60, to closed position with respect to fixed switch elements 61 and 62 respectively of a heater switch H and a motor switch M. The switch elements 59 and 60 are spring biased to open position.

The various positions which the switch-operating mechanism may assume in a drying cycle are illustrated in Figs. 2 to 6. These different positions may be explained briefly in connection with a cycle of operation, assuming that the drier is cold and is now charged with a batch of clothing to be dried.

Fig. 2 shows the position of the elements of the mechanism when the apparatus is cold, that is, when the bulb 34 is cold and the hand lever has been moved up to the starting position, so that the heater switch H is closed and the motor switch M is closed. In this position the lever 45 is substantially vertical and the tooth 52 is engaged by the detent 49. The hand lever 54 might be raised to a higher position but detent 48 would not engage tooth 52.

The circuit shown in Fig. 6 illustrates the arrangement of the apparatus with a three-wire circuit arrangement for the supply of 220 volts to the heater and 110 volts to the motor. The two high voltage leads are therefore respectively connected to the switch elements 59 and 60 while the motor 26 is connected by one lead to the lead wire 18 and to a neutral wire 63 of the three-wire current supply.

The operation carried out when drying clothes in the apparatus shown in Fig. 1, therefore, includes the energizing of the heating element 16, and the operation of the drum 12 and the fan 22 by the motor 26 to draw air through the duct 14 over the heater 16 and discharge moisture-laden air through the outlet duct 24. This operation continues until the clothes are dried and, for example, until the temperature in the drier reaches approximately 200° F., when the control mechanism assumes the position shown in Fig. 3 of the drawings.

It will be noted that as the temperature rises, the pressure on the fluid in the bulb 34 will move the shaft 41 gradually to the right, and allow the spring 47 to rotate the lever 45 on its pivot until it reaches the point at which the detent 49 disengages the tooth 52 and permits the escapement wheel to be rotated by the biasing spring 54' in a clockwise direction until the tooth 51 engages the detent 48. This movement of the escapement wheel 50 carries the cam wheel 55 and the manual lever 54 with it because of the ratchet 56, and moves the cam 57 off the switch element 59, thereby opening the heater switch. The cam 58, however, is a wide angle cam, and with the tooth 51 engaged, still maintains the motor switch closed.

Under these conditions, therefore, the motor continues to rotate the drum 12 and operate the fan 22 to draw relatively cool air from the ambient atmosphere through the drier. This cooling may continue for a period of several minutes before the drier will be cooled down to about 150° F., as an example. This cooling operation affects the bulb 34 of the thermostat so that the lever 45 is rocked back to approximately the position shown in Fig. 4 and in turn takes the detent 48 off the tooth 51, thereby releasing the escapement wheel 50 so that it immediately moves to the position shown in Fig. 4, carrying the cam wheel 55 to a position such that the cam 58 comes off the switch element 60, thereby opening the motor switch.

Fig. 4 shows the normal "off" position of the control mechanism with both switches open and no means by which the thermostat can close either switch. The bulb 34 is relatively cool because of the circulation of air through the drier after the heater is turned off. This cooling results in the movement of the lever 45 to approximately the position shown in Fig. 4. A stop, not shown, is provided to limit the movement of the elements 50, 54 and 55 to that shown.

If a new batch of clothes is to be dried immediately, and accordingly, the drier, as shown in Fig. 1, is charged with such a batch, it may happen that the heater will not come on when the lever 54 is pushed up to the starting position. This may result because of heat stored in the drier, such as in the casing 36, which would heat up the bulb 34, so that the lever 45 would be brought to approximately the position shown in Fig. 5. In this position it will be seen that the detent 49 will not engage the tooth 52, so that, even though the detent 48 would engage the tooth 51, this would only serve to operate the motor, and the operator would leave the machine thinking that the heater was on. Under these conditions only cooling would result and in a few minutes the machine would shut off.

However, the mechanism is constructed to avoid such a situation, since when the operator lifts the lever 54, it is brought up as far as it will go, that is, to the high stop position shown in Fig. 5, where the detent 48 will engage the tooth 52. This leaves the heater switch H open because of the position of the cam 57, but the motor switch M is closed, and within short time the cool air reduces the temperature of the bulb 34 until the detent 48 is moved off the tooth 52 and the detent 49 is brought around to approximately the position shown in Fig. 2, so that the detent 49 engages the tooth 52 and retains the cam wheel 55 in a position to close both switches. The drying operation then proceeds in accordance with the cycle described above in connection with Figs. 1 to 4.

It will be noted that when the handle 54 is raised to its upper position, the teeth 51 and 52 engage one or both detents 48 and 49, so that they slide along the under sloping surfaces of the teeth. At the same time, the detents are moved back one at a time, which rocks the lever 45 respectively with and against the spring 47, and the spring in the housing 40 which biases the ring 44 against the lever 42.

There may be times when the operator of the drier will have a batch of clothes in the drum 12 and have the drier proceeding normally, when something may go wrong with the motor, the fan or the belts, or the heater. In such an emergency, the operator may immediately cut off the switches both to the motor and to the heater, by simply pulling down the lever 54 to the position shown in Fig. 6 of the drawings. In this figure, it will be noted that the escapement wheel 50 is held in the position shown by the engagement of the detent 49 with the tooth 52. However, the ratchet means 56 permits the cam wheel 55 to be rotated by the handle 54 so that both the heating and motor switches are opened.

After the handle 54 is pushed down to the position shown in Fig. 6, the matter which caused the emergency is adjusted or repaired and the handle simply pushed back to the position shown in Fig. 2, where the ratchet 56 engages the wheel 50. Simple stop means, not shown, are provided to permit the escapement wheel and cam wheel to rotate within a particular desired arc, the rotation in one direction being shown approximately in Fig. 5 for both elements, whereas rotation in the opposite direction for both elements is shown in Fig. 4. Fig. 6 of course shows the limiting downward position for the handle 54 and the cam wheel 55.

When the handle 54 is moved from the position shown in Fig. 6 up to its maximum position as shown in Fig. 5, in order to have the ratchet ball engage the hole in the escapement wheel 50, it may rotate the tooth 52 to a point below the detent 48, but in the position of the lever 45 shown in Fig. 6, the tooth 52 would not engage the detent 48, but the entire rotating switch mechanism would assume the position shown in Fig. 2 where the tooth 52 engages the detent 49.

The modified form of thermostat shown in Figs. 7, 8 and 9 includes mechanism adapted to effect substantially the same cycle of operations and adapted to be operated in substantially the same way as the arrangement shown in Figs. 2 to 6, inclusive. Where the elements are the same in both devices, they are given the same reference characters. In Figs. 7, 8 and 9 the device includes a backing plate 64, on which the switches and other elements are mounted within a casing 65, of metal, plastic or other suitable material. The temperature-responsive element of the thermostat includes a casing 40 connected with a capillary 38 and in which is mounted a bellows 66 to form a chamber for the thermostatic liquid. As the liquid expands, the bellows is contracted to actuate a threaded pin 67 biased toward the bottom of the bellows 66 by a spring 68 engaging a cover plate 69 on the chamber 40. The threaded pin 67 has a rounded shoulder 70 and a portion extending through a hole in a lever 71 which is pivoted on a pin 72. The portion of the shaft 67 to the left of the lever 71 in Fig. 8 extends through a rounded washer 73, carrying a spring 74 and is keyed to a dial shaft 75 which carries a temperature setting dial 30 indicated in dotted lines. The spring 74 bears against the inside of the casing 65 and this casing also carries a suitable bearing 76 for the dial shaft 75 which is associated with a pair of calibration plates 77 secured together by screws, as indicated, at the proper calibration.

It will be noted that the lever 71 which is the detent lever and which includes tapered detent 78, is held in position between the oval shoulder 78 and the washer 73 by means of the springs 68 and 74. The upper end of the lever 71 therefore is movable to right or left in response to changes in temperature, but may be moved to the left against the bias of the spring 74 by manual or other forces supplied to the sloping surface of the detent 78.

The device shown in Figs. 7, 8 and 9 includes a cam wheel 55 having the cams 57 and 58, and the motor and heater switches M and H the same as in Figs. 2 to 6. The device also includes an escapement wheel member mounted on the same shaft as the cam wheel but the means for manually operating the cam wheel and the escapement wheel is a knob instead of a lever. The escapement wheel is made up of a pair of spaced discs 79 and 80 held in fixed relationship by spacers 81 on a hub 81' and mounted for rotation on shaft 53'. The wheel is biased by a spring 82 for counterclockwise rotation.

The cam wheel 55 is mounted on the shaft 53' and is keyed thereto by means of a set screw 83 extending through the integral hub 84 which provides a surface bearing for the escapement wheel. The spring 82 not only serves as a torsional spring for the escapement wheel, but also urges the escapement wheel toward the surface of the hub 84. The ratchet between the escapement wheel and the cam wheel comprises a ball 85 and a spring 86 set in the hub 84, the ball engaging a hole 87 in the disc 80 when the cam wheel and escapement wheel are in the normal starting position for the apparatus with the switches M and H closed as shown in Figs. 2 and 7 of the drawings.

Stop means are provided for limiting the arc through which the cam wheel and the escapement wheel may be rotated. For the escapement wheel a segment of disc 79 is cut out, leaving stop surfaces 88 and 89 which engage a pin 90 fixed to the casing 65. A disc 91 outside the casing 65 is fixed to the shaft 53' and has a similar segment cut away, the radially extending surfaces of which engage the head 92 of the pin 90 when the corresponding surfaces 88 and 89 engage pin 90.

The disc 80 of the escapement wheel, as shown in Figs. 7, 8 and 9, is provided with a tooth 93 while the disc 79 is provided with teeth 94 and 95, the teeth having the relative arcuate positions with respect to each other and to the stop means as shown in Fig. 7. The teeth 93 and 94 correspond to the teeth 52 and 51, respectively, and function the same as these teeth in the operations described in connection with Figs. 2, 3, 4 and 6. The mechanism shown in Figs. 7, 8 and 9 is in the position corresponding to that shown in Fig. 2 with the detent 78 engaging the tooth 93 and the cams 57 and 58 holding the switches H and M closed.

Now, if a drying or other cyclic operation is started, causing a rise in temperature and expansion of the liquid in the chamber 40, the upper end of the lever 71, (Figs. 8 and 9) will be moved toward the left until a point is reached, corresponding to the set temperature, as for example, 200° F., when the detent 78 will move off the tooth 93. It will be noted, however, that in this movement of the lever 71, its upper end, which includes a flat surface even with the engaging surface of the detent 78, will have moved over into the plane of the disc 79 so that the rotation effected by spring 82 upon release of the tooth 93 will only proceed until the tooth 94 engages the end of the detent lever 71. This opens the heater switch H and retains the motor switch M closed, corresponding to the position shown in Fig. 3.

After the heater is shut off the thermostat cools and the upper end of the lever 71 as shown in Fig. 8 moves again to the right, releasing the tooth 94 so that the ratchet wheel and the cam wheel rotate to the stop position with both switches open. In this position, the radial surface 89 is in engagement with the pin 90. This corresponds to the position of the mechanism shown in Fig. 4.

The apparatus shown in Figs. 7, 8 and 9 may be brought to the position shown in Fig. 5 by rotation of a knob 32 and the shaft 53' in a clockwise direction until the surface 88 engages the pin 90 and the tooth 95 engages the end of the detent lever 71 or detent 78, which would be over the plane of the disc 79 because of the heating up of the thermostatic bulb 34, as explained above. This closes the motor switch M, starts the circulation of air, and as soon as a certain amount of cooling takes place the detent 78 moves off the tooth 95 and is engaged by the tooth 93 which holds both switches closed and starts the drying cycle in the manner explained above.

When the detent 78 is in engagement with the tooth 93 and an emergency occurs, the knob 96 may be rotated in a counter-clockwise direction to open the switches M and H. In this operation the ratchet ball 85 is forced out of the hole 86 but re-engages when the knob 96 is turned in a clockwise direction to close both of the switches M and H.

Fig. 8 shows a current supply connection 97 and a current outlet connection 98 for the switch M. The connections for the switch H are similar and directly in back of these connections, therefore not shown.

The improved automatic control apparatus of the present invention is particularly useful in controlling the cycles involved in the drying of clothes, since any quantity of clothes may be dried to the desired degree without any timing mechanism. The circulation effected in the drier by the fan and the rotation of the clothes drum maintains a substantially constant drying temperature in the apparatus until the moisture content of the clothes is reduced to a relatively low value. For example, the temperature may be from about 120° F. to 150° F. during the major part of the drying operation, but as soon as the moisture content reaches a low value, the temperature rises rapidly to the point where the thermostat actuates the mechanism to shut off the heater switch. This point may be 200° F., as given in the above examples, but may be any other desired temperature, as for example, from 170° to 180° F.

If desired, the dial knob 30 may be marked in terms of the particular material to be dried, instead of the temperatures, so that when it is desired to dry a batch of cotton materials, for example, the dial 30 is turned to the marking for cotton. Different temperatures may be required for other types of materials.

From the foregoing, it will be seen that variations in the moisture content of different batches of clothes or other materials being dried are automatically taken into account, thereby relieving the operator of any responsibility for estimating the time required for drying a particular batch. The maximum temperature in the drying apparatus will not be reached and the heater will not be cut off until substantially all of the moisture is removed from the batch of the material being dried.

While the operation of the improved thermostatic control apparatus has been illustrated in connection with the use of a three-wire current supply system, it is to be understood that the conventional two-wire system supplying 110 volts may be used. Furthermore, it is to be understood that the improved thermostatic control is not limited to the use of electricity in effecting the heating operation. For example, if the heating is done by combustible gases or by steam or other heating fluid, the switch H may operate a solenoid valve to control the supply of combustible gas or of other heating fluid. In such a case the conventional two-line 110 volt electric current is sufficient for operating the motor and solenoid or solenoids necessary to effect the control, in a well-known manner.

While the improved thermostatic control apparatus has been illustrated in connection with clothes drying apparatus, it is to be understood that it may be used for controlling other cyclic operations, for example, the refining of used crank case oil, the roasting of coffee and other operations in which materials are treated or processed in a cycle. For example, in roasting coffee, a batch of coffee may be roasted for a particular length of time, then dumped into a cooling chamber where it is cooled by contact with cool air or other gaseous material. Cooling or other operations may precede or follow heating.

Furthermore, while the improved apparatus has been illustrated in connection with two switches operated in particular sequence, it is to be understood that the apparatus may include two or more switches operated simultaneously or in succession, or simultaneously and in succession, in any desired combination, for carrying out a cyclic processing or control operation. The requisite escapement teeth and detents may be provided according to the number and arrangement of the switches and the cycles desired. While escapement wheels and cam wheels are preferred, the escapement and switch-element actuating means of the apparatus may be of other types. The switches may control independent circuits and may be double pole instead of single.

I claim:

1. A thermostatic control mechanism, comprising a thermostat responsive to changes in temperature, a plurality of switches each including a movable element, means for actuating the movable elements of said switches including a cam wheel mounted for rotation on its axis, manual means for rotating said wheel for actuating the switches, said actuating means including an escapement means for retaining the cam wheel in a plurality of switch actuated positions, means for biasing said cam wheel for rotation in one direction, and means operated by the thermostat in response to changes in temperature for operating said escapement to release the cam wheel for rotation.

2. A control mechanism as claimed in claim 1 in which said escapement means comprises a toothed wheel and a detent means for engaging the teeth of the wheel and connected to the thermostat for operation thereby.

3. A control mechanism as claimed in claim 2 in which the detent means includes a pivoted lever connected to the thermostat and operated thereby in response to changes in temperature.

4. A control mechanism as claimed in claim 3 in which the lever and the toothed wheel are arranged with respect to each other so that when the lever is disengaged from one tooth of the wheel it is engaged by a second tooth.

5. A control mechanism as claimed in claim 4 in which said cam wheel includes a narrow angle cam and a wide angle cam arranged to actuate separate switches.

6. A thermostatic control mechanism, comprising a thermostat responsive to changes in temperature, a plurality of switches each including a movable element for closing and opening the switch, means for actuating the movable elements of said switches including a shaft and a cam wheel mounted on the shaft for rotation, said wheel including cams for respectively engaging the movable elements of said switches, manual means for rotating said wheel in either direction for actuating said switches, said actuating means also including a toothed escapement wheel mounted for rotation on said shaft, means for biasing the rotation of said escapement wheel in one direction, a ratchet means interconnecting said cam wheel and said escapement wheel whereby said cam wheel may be manually rotated with reference to the escapement wheel, detent means adapted to engage the teeth of and for controlling the operation of said escapement wheel, and means operated by the thermostat in response to changes in temperature for operating said detent means to thereby release said escapement wheel when a tooth thereof is in engagement with the detent means.

7. A control mechanism as claimed in claim 6 in which the movable element of each switch includes a contact means biased to open switch position.

8. A control mechanism as claimed in claim 6 characterized by including a pair of switches, a pair of cams on said cam wheel for respectively operating the movable elements of said switches, and at least one tooth on the escapement wheel for each cam on the cam wheel positioned for retaining at least one cam in operative relation with its switch element when the tooth therefor is engaged by the detent means.

9. A control mechanism as claimed in claim 6 characterized by including a cam on said cam wheel for operating the movable element of each switch, and at least one tooth on the escapement wheel for each cam on the cam wheel, said teeth being spaced apart on the escapement wheel and positioned with respect to the corresponding cams on the cam wheel for retaining at least one of the cams in operative relation with its switch element when the tooth corresponding to said one cam is engaged by the detent means.

10. A control mechanism as claimed in claim 9 in which at least one of the cams on the cam wheel is of sufficient width in relation to the spacing of the teeth on the escapement wheel that it remains in operative position with respect to its switch element when at least two teeth are successively engaged by the detent means.

11. A thermostatic control mechanism as claimed in claim 1 in which the movable element of each switch includes a contact means biased to open switch position.

12. A control mechanism as claimed in claim 1 characterized by including a pair of switches, a pair of cams on said cam wheel for respectively operating the movable elements of said pair of switches, and at least one retaining element on the escapement means for each cam on the cam wheel and operatively associated with said means operated by the thermostat.

13. A thermostatic control mechanism as claimed in claim 1 characterized by including a cam on said cam wheel for operating the movable element of each switch, at least one retaining element on the escapement means for each cam on the cam wheel operatively associated with said means operated by the thermostat, said retaining elements being spaced apart on the escapement means and positioned with respect to the corresponding cams on the cam wheel for retaining at least one of the cams in operative relation with its movable switch element when the retaining element corresponding to said one cam is engaged and held by said means operated by the thermostat.

14. A thermostatic control mechanism as claimed in claim 13 in which at least one of the cams on the cam wheel is of sufficient width in relation to the spacing of the retaining elements on the escapement means that it remains in operative position with respect to its movable switch element when at least two retaining elements are successively engaged and held by said means operated by the thermostat.

15. A thermostatic control mechanism as claimed in claim 1 characterized in that the actuating means includes means for retaining the movable switch element of at least one switch in its actuated position through a plurality of positions of said cam wheel.

16. A thermostatic control mechanism for controlling the cycle of operation of a means to be controlled, comprising a thermostat responsive to changes in the temperature of said means, a plurality of control devices for said means, a movable actuating means for operating said control devices, means for biasing said actuating means for movement in one direction to operate said control devices, an escapement means operatively associated with said actuating means for retaining the actuating means in a plurality of control positions in which said control devices are respectively in preselected conditions of operation, said escapement means being releasable by the thermostat for movement of the actuating means by said biasing means from one control position to another, and manual means for moving said actuating means through said control positions to actuate said control devices independent of the thermostat.

17. A thermostatic control mechanism as claimed in claim 16, characterized by including a cam on said movable actuating means for operating each control device, at least one retaining element on the escapement means for each cam on the actuating means, and means operable by the thermostat for engaging said retaining elements.

18. A thermostatic control mechanism as claimed in claim 17, in which one of said cams is of sufficient width in relation to the spacing of the retaining elements that it retains its control device in operated position when at least two retaining elements are successively engaged and held by the means operated by the thermostat.

19. A thermostatic control mechanism as claimed in claim 16, characterized in that said movable actuating means includes means for retaining at least one of said control devices in its actuated position while the actuating means is moved through a plurality of control positions.

20. In a thermostatic control mechanism for controlling the cycle of operation of a means to be controlled, including a thermostat responsive to changes in the temperature of said means, a control means, a movable actuating means for operating said control means including a cam wheel mounted for rotation on its axis and having a plurality of peripheral cams, an escapement means operatively associated with said actuating means for retaining the cam wheel in a plurality of control positions, means for biasing said cam wheel and said escapement means for movement in one direction to actuate said control means by said cams, means operated by the thermostat and operatively associated with the escapement means for releasing the escapement means for movement by said biasing means and the cam wheel for rotation from one control position to another, and manual means independent of the thermostat for rotating said cam wheel through said control positions.

THEODORE E. GRAVES.

REFERENCES CITED

The following references are of record in the file of this patent:

UNITED STATES PATENTS

| Number | Name | Date |
|---|---|---|
| 1,935,371 | Osborne et al. | Nov. 14, 1933 |
| 2,053,248 | Frank | Sept. 1, 1936 |

FOREIGN PATENTS

| Number | Country | Date |
|---|---|---|
| 277,383 | Great Britain | Sept. 13, 1927 |